Figure 1:
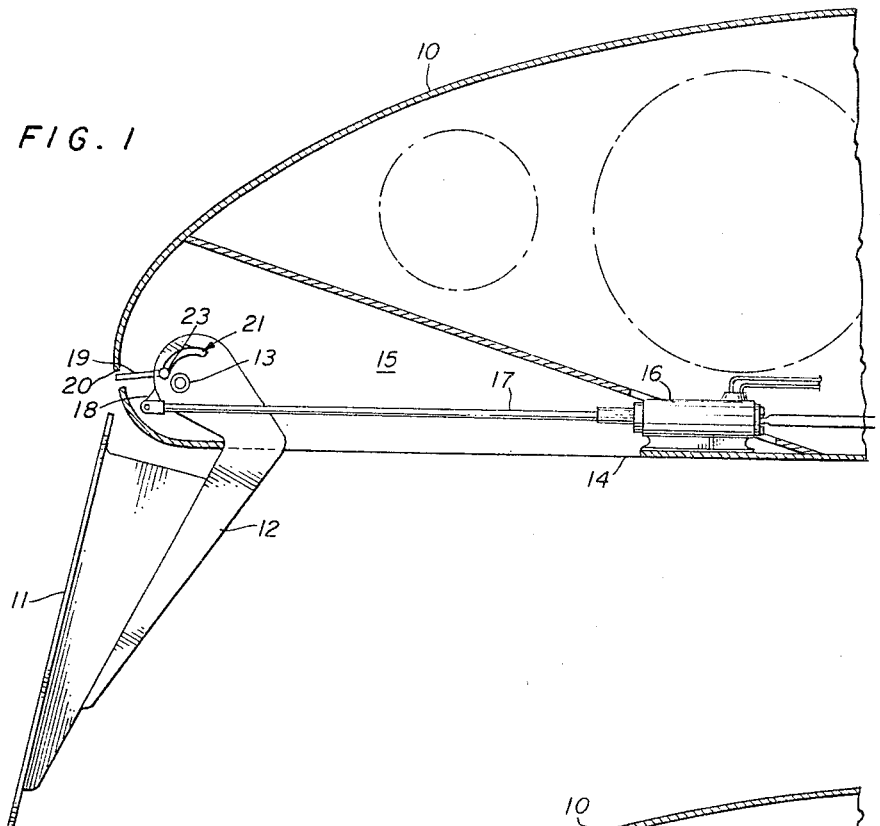

INVENTOR
JOHN E. STEINER

United States Patent Office 3,282,535
Patented Nov. 1, 1966

3,282,535
LEADING EDGE SPOILER AND FLAP WING
STALL CONTROL MEANS
John E. Steiner, Bellevue, Wash., assignor to The Boeing Company, Seattle, Wash., a corporation of Delaware
Filed Nov. 12, 1964, Ser. No. 410,542
12 Claims. (Cl. 244—42)

This invention pertains to a new leading edge aerodynamic device for wing stall control on an aircraft.

More particularly, it comprises a wing leading edge spoiler that is extendible during the flaps up configuration to produce a rough leading edge surface and that is retractable during the flaps down configuration to produce a clean leading edge surface.

While airplane stall is not a normal flight condition, it is necessary that the airplane be designed to have satisfactory stall characteristics in order that it can be certificated and also in order that it will be a safe airplane for airline operations. In airline operations, pilots do not voluntarily stall the aircraft. Occasionally a stall is produced through rough air or through inattention on the part of the pilots, or possibly, through an act on the part of the automatic pilot.

The phenomena of stall concerns the airplane wing and is actually, of course, wing stall. It is the case in which the airplane is slowed in speed or the nose is raised to such an angle that the air flow can no longer follow the entire upper surface of the wing contour, and breaks away from the wing. When it breaks away from the wing contour, it can be either a gradual break or a sharp break. The manner in which the break occurs is controlled by the airfoil section used and by local conditions on the airfoil such as "roughness" of the leading edge. Roughness can be either a small roughness such as caused by rivet heads, or it can be a large roughness such as caused by a spoiler. If a spoiler or "trip strip" is to be used, it is generally to make that section of the wing over which it is used stall under a particular set of angle of attack or attitude conditions to result in the stalling characteristics desired by the designer.

The characteristics of the entire airplane at the stall depend upon an integration of the activity of each part of the span since on any airplane in question the entire wing will not stall as a unit. The overall stall characteristics of the airplane can be controlled by forcing different sections of the wing to stall early or late.

In a swept wing airplane the center section of the wing is ahead of the center of gravity of the aircraft, whereas the wing tip is well aft of the center of gravity of the aircraft. Therefore by acting upon the spanwise progression of the stall, one can control the pitching moments produced and therefore control whether the nose will drop or whether the nose will rise.

This is, of course, the low speed stall and not necessarily the high speed, or shock, or Mach number induced stall.

In a swept wing airplane it is undesirable that the center section stall last because if the tips stall before the center, the airplane will tend to pitch up. Pitching up, of course is a condition which is not desired and will put the airplane further into the stall. Until the airplane can be made to pitch downward, that is nose downward, no recovery can be effected. If the airplane can be made to pitch downward, either voluntarily or involuntarily, then the airplane will gain speed and will unstall itself, or be easy for the pilot to unstall and to make a safe recovery therefrom.

Thus it may be desirable that the inboard sections of the swept wing airplane have deliberate leading edge roughness in order to precipitate an inboard stall and therefore a nose down pitch. This is accomplished by the disclosed invention.

Modern airplanes fly in two general configurations; either wing flaps up or wing flaps down. With the wing flaps up, or retracted, such leading edge roughness, if it is placed near the stagnation point where the air normally is not moving at the surface of the airfoil in cruising flight, results in little or no drag on the airfoil. However, the desired location of deliberate leading edge roughness will not be the same for a flaps up or a flaps down case, and in addition, in the flaps down case, the effect of nose down pitch may be secured by other means. For example, altering the leading or trailing edges with high lift devices thereon along the span so that no installation of a trip strip is required.

Accordingly, a primary object of this invention is to provide a method for controlling the stalling speed of an aircraft wing.

Another primary object of this invention is to provide improved stalling characteristics in an aircraft in the form of involuntary dropping of the nose of the aircraft when most required.

Another primary object of this invention is to provide spanwise stall control in an aircraft wing when its flaps are up or retracted and removing the stall control device when not required as in the flaps extended condition.

Another object of this invention is to provide in an aircraft the securing of a different configuration between the flaps up condition and the flaps down condition while avoiding a separate actuation system.

A further object of this invention is to provide a stall trip strip in the flaps up condition which is automatically removed when the flaps are extended.

A still further object is to provide an areodynamic stall control device for an aircraft wing that forms a rough leading edge surface when the wing flap is retracted and a smooth leading edge surface when the flap is extended.

Another object of this invention is to provide an aerodynamic stall control device for an aircraft wing comprising a retractable leading edge flap on the wing having a retracting-extending actuator and a retractable leading edge spoiler responsive to the actuator for extending the spoiler when the flap is retracted and for retracting the spoiler when the flap is extended.

Other objects and various advantages of the disclosed wing stall control means will be apparent from the following detailed description, together with the accompanying drawings, submitted for purposes of illustration only and not intended to define the scope of the invention, reference being had for that purpose to the subjoined claims.

Briefly, this invention comprises a method of stall control of an aircraft wing and at least two devices, the preferred device comprising a retractable flap pivotally mounted in the wing leading edge, an actuator for extending and retracting the flap, and a retractable spoiler connected to the flap and responsive to movement of the flap or its actuator for being extended when the flap retracts and for being retracted when the flap extends.

Figure 2:
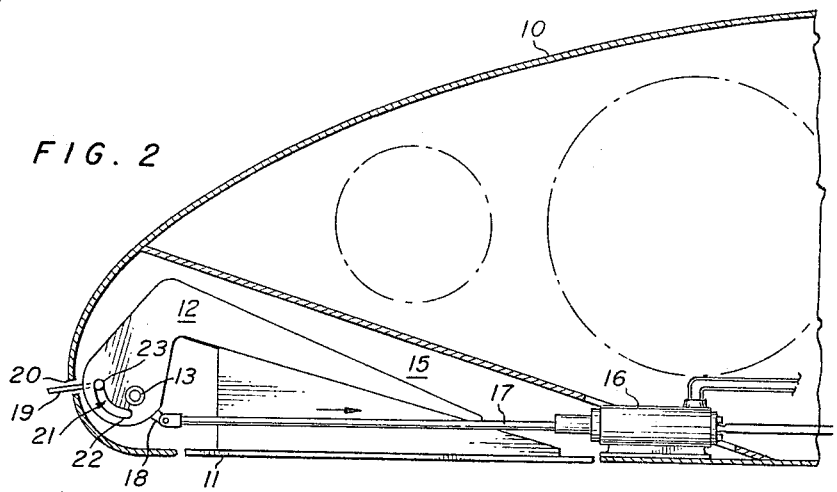

The specification discloses by way of example, not by way of limitation two forms of the invention and wherein on the drawing like reference numerals designate corresponding parts in the several views in which:

FIG. 1 is a schematic view with parts in section, of the leading edge of a wing illustrating a flap extended and a spoiler retracted, and FIG. 2 is a view similar to FIG. 1 illustrating the flap retracted and the spoiler extended.

The invention disclosed herein is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

Aircraft incorporating high lift systems, particularly including swept wing aricraft, generally require devices to provide good stall characteristics in both low speed and high speed configurations. In aircraft utilizing leading edge flaps it is desirable that the fixed leading edge surfaces be smooth.

The same aircraft in the clean condition with flaps retracted usually has aerodynamic longitudinal characteristics which make leading edge roughness desirable in order to avoid pitch up at the stall.

The disclosed invention produces the above desired results.

An aircraft wing leading edge 10, well forward of the aircraft e.g. (center of gravity) is illustrated in FIGS. 1 and 2, with a spanwise leading edge flap 11, or lift generating means having a goose neck supporting arm 12 pivotally mounted in the wing leading edge with pin 13. As shown in FIG. 1, for retracting the flap 11 and its arm 12 through wing lower surface opening 14 into cavity 15, a conventional actuator 16, such as, but not limited to, an electro-hydraulic motor operates push-pull rod 17 pivotally attached to a lever 18 rigidly mounted on the flap arm 12.

A leading edge spanwise spoiler or stall inducing means, 19, FIGS. 1 and 2 is mounted for translational movement fore and aft through skin slot opening 20 in the wing leading edge 10, the spoiler being shown retracted internally of the wing in FIG. 1 and shown extended into the slipstream externally of the wing in FIG. 2.

Another feature of the instant invention is the operation of the spoiler and the flap by the common actuator 16. While various connecting means may be employed between the spoiler 19 and the actuator 16, such as pivotally connecting the spoiler and push-pull rod 17 to opposite arms of a bellcrank, or the like, a preferred connecting means is the cam and cam follower type illustrated in FIGS. 1 and 2. As shown in FIG. 2, for example, an arcuate cam or cam slot 21 is formed in spoiler arm 12 around pivot 13, the lower end 22 of the slot being radially closer to the pivot than the other end. Fixed to spoiler 19 is a cam follower 23 operable in the cam slot 21.

Accordingly in operation of the stall control device, FIG. 1 shows the flap 11 lowered or extended for slow speed flight by forward movement of push-pull rod 17, the spoiler 19 being retracted due to the cam follower 23 being farther away from the opening 20 or radially closer to pivot 13 to provide a smooth leading edge on the wing. FIG. 2 illustrates the high speed configuration of the wing in which the flap 11 has been retracted by counterclockwise rotation of flap arm 12, and the cam follower actuated outwardly by the cam 21, both flap and spoiler being operated by the common actuator 16. A rough leading edge results.

Thus good stall control is obtained in an aircraft wing when its flaps are up or retracted, as by roughening of the wing leading edge with a retractable spoiler when in this high speed configuration, and yet this stall inducing means is automaticaly removed when not desired as with flaps extended. Likewise, a separate actuator for the spoiler is avoided, the spoiler being responsive to actuation of the flap or its actuator.

While a method and only two embodiments of the invention have been shown in the accompanying drawing, it will be evident that various other modifications are possible in the arrangement and construction of the disclosed leading edge spoiler and flap wing stall control means without departing from the scope of the invention.

I claim:

1. A method for controlling the stalling speed of an aircraft wing having a retractable leading edge flap and a retractable leading edge spoiler comprising,
    (a) retracting the spoiler with extension of the flap to provide a smooth leading edge surface in the low speed configuration of the wing, and
    (b) extending the spoiler with retraction of the flap to roughen the leading edge for improved stall control of the wing in the high speed configuration.

2. A method for controlling the stalling speed of an aircraft wing having a retractable leading edge flap and a retractable leading edge spoiler comprising,
    (a) extending the flap for the low speed configuration,
    (b) retracting the spoiler to provide a smooth leading edge surface in the low speed configuration,
    (c) retracting the flap for the high speed configuration, and
    (d) extending the spoiler to roughen the leading edge for improved stall control of the wing in the high speed configuration.

3. A method for controlling the stalling speed of an airplane having a wing comprising,
    (a) forming a smooth leading edge surface on the wing for the low speed configuration of the wing, and
    (b) roughening the leading edge surface on the wing for the high speed configuration of the wing.

4. An aerodynamic stall control device for an aircraft wing having a leading edge comprising,
    (a) retractable flap means for the leading edge of the wing, and
    (b) retractable spoiler means for the leading edge of the wing,
    (c) means responsive to said flap means and connected to said spoiler means for forming a rough leading edge surface when said flap means is retracted and for forming a smooth leading edge surface when said flap means is extended.

5. An aerodynamic control device for an aircraft wing having a leading edge comprising,
    (a) retractable lift generating means for the leading edge of the wing, and
    (b) retractable lift spoiling means for the leading edge of the wing,
    (c) means responsive to said lift generating means and connected to said lift spoiler means for spoiling the lift on the wing only when said lift generating means is retracted.

6. An aerodynamic stall control device for an aircraft wing having a leading edge comprising,
    (a) retractable flap means for the leading edge of the wing, and
    (b) retractable spoiler means for the leading edge of the wing,
    (c) means responsive to said flap means and connected to said spoiler means for extending to form a rough leading edge surface when said flap means is retracted and for retracting to form a smooth leading edge surface when said flap means is extended.

7. An aerodynamic control device for an aircraft wing having a leading edge and a normal stall speed comprising,
    (a) retractable lift increasing means for the leading edge of the wing, and
    (b) retractable stall inducing means for the leading edge of the wing,
    (c) means responsive to said lift increasing means and connected to said stall inducing means for lowering the stalling speed of the wing below the normal wing stalling speed when said lift increasing means is retracted and for being removed when said lift increasing means is extended.

8. An aerodynamic stall control device for an aircraft wing having a leading edge comprising,
    (a) a retractable flap, said flap being pivotally mounted to the wing for movement between a retracted position internally of the wing and an extended position forward of the wing leading edge,
  (b) actuating means for retracting and extending said flap, and
  (c) retractable spoiler means for the leading edge of the wing,
  (d) means responsive to said actuating means and connected to said spoiler means for forming a rough leading edge surface when said flap is retracted, and for forming a smooth leading edge surface when said flap is extended.

9. An aerodynamic stall control device for an aircraft comprising,
  (a) an aircraft wing, said wing having a leading edge,
  (b) retractable flap means for said wing leading edge,
  (c) actuating means for retracting and extending said flap means,
  (d) slot means in said flap means, and
  (e) a retractable spoiler movably mounted in said wing leading edge for movement between positions internally and externally of said leading edge,
  (f) said spoiler being connected to said slot means and responsive to said flap means for extending to form a rough leading edge surface when said flap means is retracted and for retracting to form a smooth leading edge surface when said flap means is extended.

10. An aerodynamic stall control device for an aircraft comprising,
  (a) an aircraft wing, said wing having a leading edge,
  (b) a retractable flap, said flap being pivotally mounted to said wing for movement between a retracted position internally of said wing and an extended position forward of said wing leading edge,
  (c) actuating means for retracting and extending said flap means,
  (d) a retractable spoiler movably mounted in said wing leading edge for movement between a position internally of said leading edge and a position externally of said leading edge, and
  (e) means connecting said retractable flap to said retractable spoiler for making said spoiler responsive to said flap for extending to form a rough leading edge surface when said flap is retracted and for retracting to form a smooth leading edge surface when said flap is extended.

11. An aerodynamic stall control device for an aircraft as recited in claim 7 wherein,
  (a) said connecting means comprises a cam follower secured to said spoiler and operable on an accurate cam formed in said flap and around the flap pivot, one end of said cam being closer to said wing leading edge than the other end whereby retracting movement of said flap about its pivot extends said spoiler beyond said leading edge and extending movement of said flap about its pivot retracts said spoiler internally of said leading edge.

12. An aerodynamic stall control device for an aircraft comprising,
  (a) an aircraft wing, said wing having a leading edge,
  (b) retractable flap means for said wing comprising a flap movable between a position extending from said wing and a position retracted in said wing,
  (c) actuating means for retracting and extending said flap, and
  (d) retractable spoiler means for said wing comprising a spoiler movable between a position extending from said wing and a position retracted in said wing,
  (e) said spoiler means being responsive to said flap actuating means for extending said spoiler when said flap is retracted and for retracting said spoiler when said flap is extended.

References Cited by the Examiner
UNITED STATES PATENTS

| 1,726,118 | 8/1929 | Page | 244—42 |
| 2,357,680 | 9/1944 | Molloy | 244—42 |
| 2,503,585 | 4/1950 | Loedding | 244—42 |
| 2,719,014 | 9/1955 | Koppen | 244—42 |

References Cited by the Applicant
UNITED STATES PATENTS

| 1,862,795 | 6/1932 | Mammen. |
| 2,034,095 | 3/1936 | Hathorn. |
| 2,587,359 | 2/1952 | Milans. |
| 2,631,794 | 3/1953 | Warner. |

MILTON BUCHLER, *Primary Examiner.*

B. BELKIN, *Assistant Examiner.*